(12) United States Patent
Leinenbach et al.

(10) Patent No.: US 6,712,978 B2
(45) Date of Patent: *Mar. 30, 2004

(54) PROCESS FOR MANUFACTURING AN ADSORBENT FOR REDUCING THE CONCENTRATION OF FIBRINOGEN AND/OR FIBRIN, AN ADSORBENT AND METHOD OF PRODUCING AN ADSORBER FROM THE ADSORBENT

(75) Inventors: Hans-Peter Leinenbach, Tholey (DE); Heike Mitschulat, St. Wendel (DE); Wolfgang Metzger, Saarbrüken (DE); Veit Otto, St. Wendel (DE); Martin Hepper, Neustadt (DE)

(73) Assignee: Fresenius HemoCare GmbH, Bad Homburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,709

(22) Filed: Mar. 9, 2001

(65) Prior Publication Data

US 2002/0028888 A1 Mar. 7, 2002

(30) Foreign Application Priority Data

Mar. 9, 2000 (DE) .......................... 100 11 482

(51) Int. Cl.$^7$ .......................... B01J 20/32; B01J 20/26; C08F 8/32; C07K 14/75
(52) U.S. Cl. .................... 210/692; 502/402; 525/327.3; 525/378; 604/6.1
(58) Field of Search ........................ 210/692; 502/402; 525/327.3, 378; 604/6.1

(56) References Cited

U.S. PATENT DOCUMENTS

| | | | | |
|---|---|---|---|---|
| 5,096,593 A | * | 3/1992 | Wakita et al. | 210/656 |
| 5,185,313 A | * | 2/1993 | Porath | 502/402 |
| 5,326,698 A | * | 7/1994 | Kasche et al. | 435/231 |
| 5,476,715 A | * | 12/1995 | Otto | 428/407 |
| 5,667,684 A | * | 9/1997 | Motomura et al. | 210/506 |
| 5,719,269 A | * | 2/1998 | Schwarz et al. | 530/415 |
| 6,090,292 A | * | 7/2000 | Zimmermann et al. | 210/690 |

FOREIGN PATENT DOCUMENTS

| | | |
|---|---|---|
| DE | 197 29 591 | 2/1999 |
| WO | WO 95/26988 | * 12/1995 |

OTHER PUBLICATIONS

Printout of Internet Website, www.rohmamerica.com/Eudragit/Eupergit/, May 22, 2003.*

J. Fadul et al., "Reduction of Plasma Fibrinogen, Immunoglobulin G, and Immunoglobulin M Concentrations by Immunoadsorption Therapy with Tryptophan and Phenylalanine Adsorbents," Artificial Organs, vol. 20, No. 9, 1996, pp. 986–990.

* cited by examiner

Primary Examiner—D. R. Wilson
(74) Attorney, Agent, or Firm—Kenyon & Kenyon

(57) ABSTRACT

A process for manufacturing an adsorbent for reducing the concentration of fibrinogen and/or fibrin in blood or blood plasma in which a carrier material, which is preferably a copolymer derived from (meth)acrylates and or (meth)acrylic acid amides, is activated by amination, and subsequently undergoes thermal treatment at a temperature of over 100° C. An adsorber for the purpose of reducing the concentration of fibrinogen and/or fibrin in blood or blood plasma may be produced from the adsorbent.

10 Claims, 4 Drawing Sheets

1) Adsorbent, aminated: 7.29 (mg/ml carrier)
2) Adsorbent, aminated, heat activated: 10.99 (mg/ml carrier)

PROCESS FOR MANUFACTURING AN ADSORBENT FOR REDUCING THE CONCENTRATION OF FIBRINOGEN AND/OR FIBRIN, AN ADSORBENT AND METHOD OF PRODUCING AN ADSORBER FROM THE ADSORBENT

FIELD OF THE INVENTION

The present invention relates to a process for manufacturing an adsorbent for the purpose of reducing the concentration of fibrinogen and/or fibrin in blood or blood plasma, in which a carrier material is activated by the introduction of covalently bonded alkaline groups, and the activated carrier material then undergoes a thermal treatment at a temperature of over 100° C. Furthermore, the invention relates to an adsorbent manufactured in this way, and a method of producing an adsorber from the adsorbent for the purpose of reducing the concentration of fibrinogen and/or fibrin in blood or blood plasma.

BACKGROUND OF THE INVENTION

Adsorbents are widespread in medical technology. Adsorbers with adsorbents that remove low density lipoproteins (LDL) from blood or reduce their concentration, such as those known from German Patent No. 39 32 971, are frequently described. German Patent No. 39 32 971 describes the adsorber material as an organic carrier having a fixed particle size and exclusionary threshold, which bears a ligand on its surface, to which the LDL molecule bonds.

In German Patent No. 197 29 591, the use of a ligand for fibrinogen and/or fibrin is claimed in order to cure the diseases engendered on the basis of an excessively elevated proportion of fibrinogen in the blood, or to at least prevent such diseases. In the process described in German Patent No. 197 29 591, the ligand is defined as a substance that binds specifically to fibrinogen and/or fibrin, and is preferably a peptide with three to ten amino acids.

The reduction of concentrations of plasma fibrinogen, immunoglobulin G (IgG) and immunoglobulin M (IgM) by means of immunoadsorption therapy with tryptophan or phenylalanine adsorbents is known from *Artificial Organs*, volume 20, No. 9 (1996), pp. 986–990. In immunoadsorption therapy, adsorption columns are used which exhibit spherical polyvinyl alcohol (PVA) gel particles as carriers. On their surfaces, the PVA gel particles carry either tryptophan or phenylalanine as an amino acid ligand, which is covalently bonded to the PVA by way of spacers. The plasma, which is separated from blood cells, is conducted via the adsorption column and thereafter, before being led back to the patient, reunited with the blood cells again. With this immunoadsorption therapy, simultaneously, the concentrations of fibrinogen, IgG and IgM are significantly reduced.

Even if adsorption has, in the meantime, made its way into the clinical routine as a means of ameliorating illnesses, increasing demands are being made on the selectivity of adsorption. In other words, although the adsorbers are not permitted to adsorb any proteins that are needed by human beings, or as few of them as possible, it is also desirable that the reduction of the concentration of harmful proteins be so great that the extra-corporal treatment, which is a burden to the patient, is as effective as possible.

It has been known for some time that a number of diseases are based upon a lack of micro-circulation of the blood. The diseases enumerated in Table 1, which follows below, could be mentioned by way of example.

TABLE 1

CNS:
Stroke
TIA (Transient Ischemic Attack)
PRIND (Prolonged Reversible Ischemic Neurological Deficit)
Chronic vascular diseases of the CNS
Chronic intracranial perfusion disorders
Chronic extracranial perfusion disorders
Cerebro-vascular perfusion disorders
Dementia
Alzheimer's disease
Severe central vertigo
Eye:
Chronic perfusion disorder
Acute vascular occlusion
Ear:
Sudden deafness
Vertigo emanating from inner ear
Meniere's disease
Lung:
Primary pulmonary hypertension
Veno-occlusive lung diseases
Thrombotic primary pulmonary hypertension
Thromboembolitic diseases of the major vessels
Heart:
Transplant vasculopathies
Acute myocardial infarction
Unstable angina pectoris
Small vessel disease of the heart
Inoperable severe coronary heart disease
Cardiomyopathies
Abdomen:
Angina abdominalis
Kidneys:
Renal vasculopathies
Glomerulonephritides
Chronic renal insufficiency
Peripheral arterial occlusion diseases
Acute vascular occlusions
Vasculitides
Septic shock
Disseminated intravascular coagulation (DIC) of different
  origin, e.g. in tumors
Type I + II diabetes
Diabetic retinopathy
Diabetic neuropathy
Diabetic nephropathy Thus far, these diseases have, for the most part, been treated with medications, and often, in the process, nothing more than an elimination of the symptoms has occurred. The measures that have been known thus far for treating and influencing the micro-circulation and the rheology of the blood consist of plasma exchange, heparin-induced extra-corporal LDL cholesterol precipitation (HELP) and the adsorption of fibrinogen with the aid of a ligand, to which fibrin and/or fibrinogen specifically binds. The use of a ligand of that type is described in German Patent No. 197 29 591. Peptides that exhibit, preferably, three to ten amino acids, such that the particularly preferred sequence is said to be glycine-proline-arginine-proline-X, are cited as ligands.

The synthetic production of peptides, however, is a complex and costly process, so that the use of a specific adsorber as a ligand is very costly.

Beyond that, peptides longer than a certain length trigger antibody reactions so that after repeated use, pronounced immune reactions can result in the long term. Indeed, in order to reduce the immune defense, peptide oligomers that are as short as possible are used, but immunogenicity can never be fully precluded. In addition, leakage, an unnoticed release of pieces of peptide, is particularly dangerous, because as components of the body's inherent structures, peptides represent bioactive molecules.

In addition, as described in *Artificial Organs*, volume 20, No. 9 (1996), pp. 986–990, immunoadsorption therapy also employs the amino acids tryptophan or phenylalanine for bonding onto the PVA gel particles, and therefore, it too is complicated and costly. Furthermore, with this therapy, even substances that should not be removed from the plasma, such as IgG and IgM, are removed from the plasma in amounts that are comparable to those of the fibrinogen.

SUMMARY OF THE INVENTION

The object of the present invention is to create a process for manufacturing an adsorbent for the purpose of reducing the concentration of fibrinogen and/or fibrin in blood or blood plasma that exhibits better elimination ratios and can be produced more cost-effectively than those adsorbents known in the art. The adsorbent should also be biocompatible and cause no immune defense.

DETAILED DESCRIPTION

Figure 1:
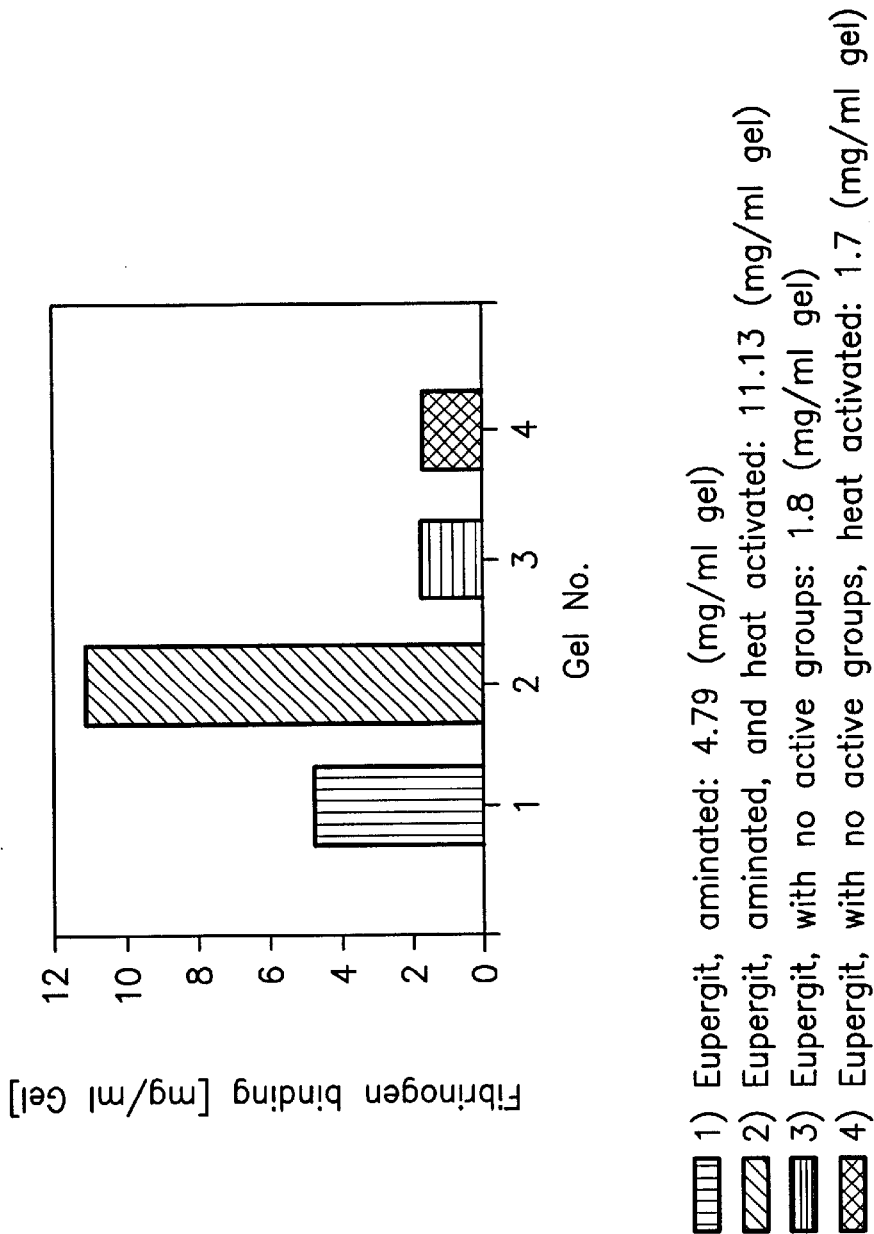
FIG. 1 is a graph showing the reduction of fibrinogen for example 1.

It has been surprisingly discovered herein that an adsorbent that exhibits a carrier material with an alkaline surface that was then subjected to thermal treatment at a temperature of over 100° C. causes a clearly better reduction of the fibrinogen level than all adsorbents known thus far, such that following treatment, micro-circulation is improved. The effectiveness is increased particularly by amine and/or amide groups on the external surface of the carrier material after the thermal treatment. It makes no difference in this regard whether the carrier material was merely aminated (e.g., by being treated with ammonia), or if covalently bonded synthetic lateral chains which exhibit amine or amide groups and are stable at temperatures of over 100° C., especially 121° C., were introduced into the carrier material. With the aid of a thermal treatment greater than 100° C., it is possible to increase the reduction of the fibrinogen level achieved by all known adsorber materials that have amine or amide groups in terminal positions or located in the lateral chain, and that are stable at temperatures of over 100° C., especially 121° C. It has also been surprisingly discovered herein that by merely agitating the surface, which is easily done (e.g., with ammonia), and preferably with subsequent thermal activation, excellent fibrinogen binding capabilities are obtained. Accordingly, there is no need to introduce either ligands that specifically bind to fibrinogen, or synthetic lateral chains.

Using the process of the present invention for manufacturing an adsorbent avoids complex and expensive manufacturing of an adsorbent.

The possibility of being sterilized, especially the possibility of being sterilized by means of heat, for example at 121° C., is important for the use of such an adsorbent, due to the fact that the treated blood is to be returned to the patient, and it must not trigger any sepsis or inflammations. In the process of the present invention, it is especially advantageous that both the thermal treatment and the sterilizing can be carried out simultaneously in only one single processing step. In addition, the adsorbent manufactured according to the present invention is bio-compatible.

In principle, several different types of carrier substances are suitable for use in the process according to the present invention, such as, for example, glass, carbohydrates, sepharose, silica, or organic carrier materials, such as copolymers of acrylates or methacrylates, as well as polyamides. Preferably, the carrier substance consists of organic material, and copolymers that are derived from (meth) acrylates and/or (meth)acrylic acid amides are especially preferred. These exhibit epoxide groups, preferably. The term "(meth)acrylic" is taken to mean both the corresponding acrylic as well as the methacrylic compounds.

Most preferred as a carrier material for the adsorbent according to the present invention is a statistical copolymer produced by the polymerization of the monomeric units:

(A) (Meth)acrylamide, in a quantity of 10 to 30% by weight, (B) N,N'-methylene-bis(meth)acrylamide, in a quantity of 30 to 80% by weight, and (C) Allyl glycidyl ether and/or glycidyl—(meth) acrylate in a quantity of 10 to 20% by weight, relative to the total weight of the monomeric units, in each case.

The copolymer is preferably produced by means of suspension polymerization. Such a copolymer is commercially available from Röhm GmbH under the designation Eupergit C250L or Eupergit FE162.

The aforementioned copolymer or another organic carrier material that preferably contains oxirane groups (epoxide groups), for example, a copolymer, whose use is also preferred within the context of the present invention, which was obtained by means of suspension polymerization of ethylene glycol dimethacrylate and glycidyl methacrylate and/or allyl glycidyl ether, is activated by introducing alkaline groups covalently bonded to the carrier material, preferably groups containing nitrogen and most preferably amine groups. Activation preferably takes place with ammonia or a primary amine, whereby the most preferred, for reasons having to do with process engineering and cost savings, is the utilization of an aqueous solution of ammonia.

The carrier material can be present in the form of spherical, unaggregated particles, so-called beads, fibers, or a membrane, such that a porosity of the carrier material increases the surface area. The porosity can be achieved, for example, by adding pore-forming substances, such as cyclohexanol or 1-dodecanol, to the reaction mixture of the suspension polymerization. It is advantageous, furthermore, if the porous carrier material possesses an exclusionary threshold of at least $10^7$ Dalton, so that the fibrinogen can penetrate into the pores with the plasma, in order to make its way to the alkaline groups.

Another advantageous embodiment of the present invention lies in the notion of using the adsorbent manufactured according to the present invention in whole blood. To this end, the carrier material consists of unaggregated, spherical particles in a range of particle sizes extending from 50 to 250 μm, and it possesses an exclusionary threshold of at least $10^7$ Dalton. As a result, blood cells can come into contact with the adsorbent without clogging the column that contains the adsorbent, and without the retention or aggregation of an unreasonable number of cells. This is rendered possible by the size and spherical shape of the beads in conjunction with the exclusionary threshold in the case of the adsorbent manufactured according to the present invention, due to the fact that the cells glide along the smooth outer surface of the beads, as a result of which only slight thrombocytic adhesion occurs and the plasma with the fibrinogen nevertheless has the opportunity of penetrating into the pores.

As a result, extra-corporal steps are eliminated, such as the removal of blood cells, the treatment of the isolated plasma, and the reuniting of blood components, as a result of which the biocompatibility of the process is enhanced; for is example, the danger of a complementary activation is further diminished to a considerable degree. The elimination of extra-corporal steps causes a shortening of treatment time and a simplification of the process, as a result of which an enhancement of patient safety and well-being is achieved.

An adsorber that is equipped with the adsorbent manufactured according to the present invention exhibits a housing, which is embodied, preferably, in tubular or columnar form, and which contains the adsorbent as filler material. With respect to the customary amount of blood or blood plasma that is to be put through the adsorber, and the efficiency of the adsorber, according to the present invention the adsorber comprises, preferably, a volume of 250 to 1250 ml. The adsorber can be used individually, or in dual or multiple operation. In the case of two or more adsorbers, there is the possibility of alternately supplying one adsorber with blood or blood plasma while the other adsorber is regenerated. This leads to a further efficiency when using the adsorbent manufactured according to the present invention. The adsorber containing the adsorbent is preferably embodied in such a way that it exhibits a housing with an inlet zone on the same side as the head, through which the blood or blood plasma enters the adsorber, such that in this case, the outlet is found at the bottom of the adsorber's housing.

In order to prevent undesired substances, such as substances that originate from the adsorbent material, from being led back to the patient's circulatory system along with the treated blood or blood plasma, a filter is found, preferably on the outlet of the adsorber's housing. Preferably, this filter is a particle filter.

By way of example, two embodiment forms of the process according to the present invention are described below.

EXAMPLE 1

100 ml aqueous ammonia (12.5%) were added per 10 g dry weight of Eupergit C250L from the firm of Röhm GmbH (Lot No. 1690419573) and incubated for 4 hours on a tumbler at room temperature. Then, the aminated carrier material was washed 10 times using 200 ml aqua dest. each time. Amination of the Eupergit, a copolymer from methacrylamide, allyl glycidyl ether, glycidyl methacrylate, and N,N'-methylene-bis(methacrylamide), can be shown schematically as in the diagrams below:

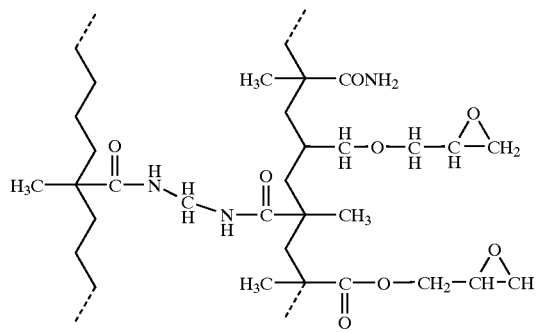

Eupergit copolymer (Rohm GmbH)

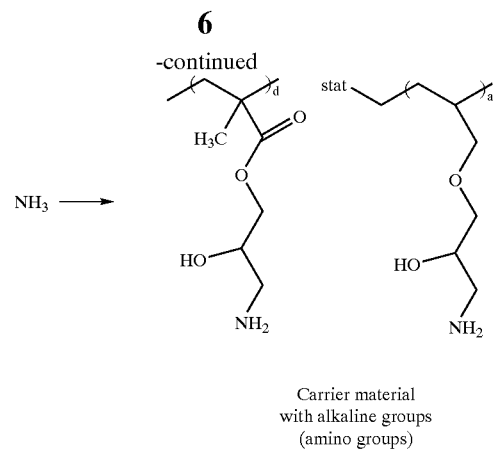

Carrier material with alkaline groups (amino groups)

A portion of the washed and dried aminated (i.e., activated) carrier material is heat sterilized at 121° C.

Using a batch process, the adsorbents obtained in this manner, i.e., the non-activated and activated Eupergit copolymer, having undergone thermal treatment at 121° C. or not, respectively, were tested as to their fibrinogen binding properties. To that end, 5 ml human plasma for each test, which was anticoagulated with citrate in a ratio of 20:1, were incubated with 1 g (wet weight) adsorbent for 1 hour at room temperature on a roller mixer. The fibrinogen content in the supernatant was turbidimetrically determined both before incubation and after incubation on a coagulometer (BCS from the firm of Behring) using the CLAUSS method (Clauss, A., Quick clotting physiology method for determining fibrinogen: Acta Haematologica (1957) 17, 237–246). The binding capacity is derived from differences between values before and after incubation. In Example 1, the initial fibrinogen concentration was 3.3 mg/ml plasma.

In FIG. 1, the reduction of fibrinogen, i.e., the fibrinogen binding in mg/ml gel (carrier material), is shown in comparison to both the non-activated and activated adsorbents which had been, respectively, thermally treated or not thermally treated.

FIG. 1 shows significantly greater fibrinogen binding of the carrier material with amino groups as opposed to the non-aminated carrier material. It further shows that the thermal treatment of the activated (aminated) carrier material leads to a markedly increased fibrinogen binding capacity, while thermal treatment of the non-activated carrier material does not result in additional binding capacity.

Figure 2:
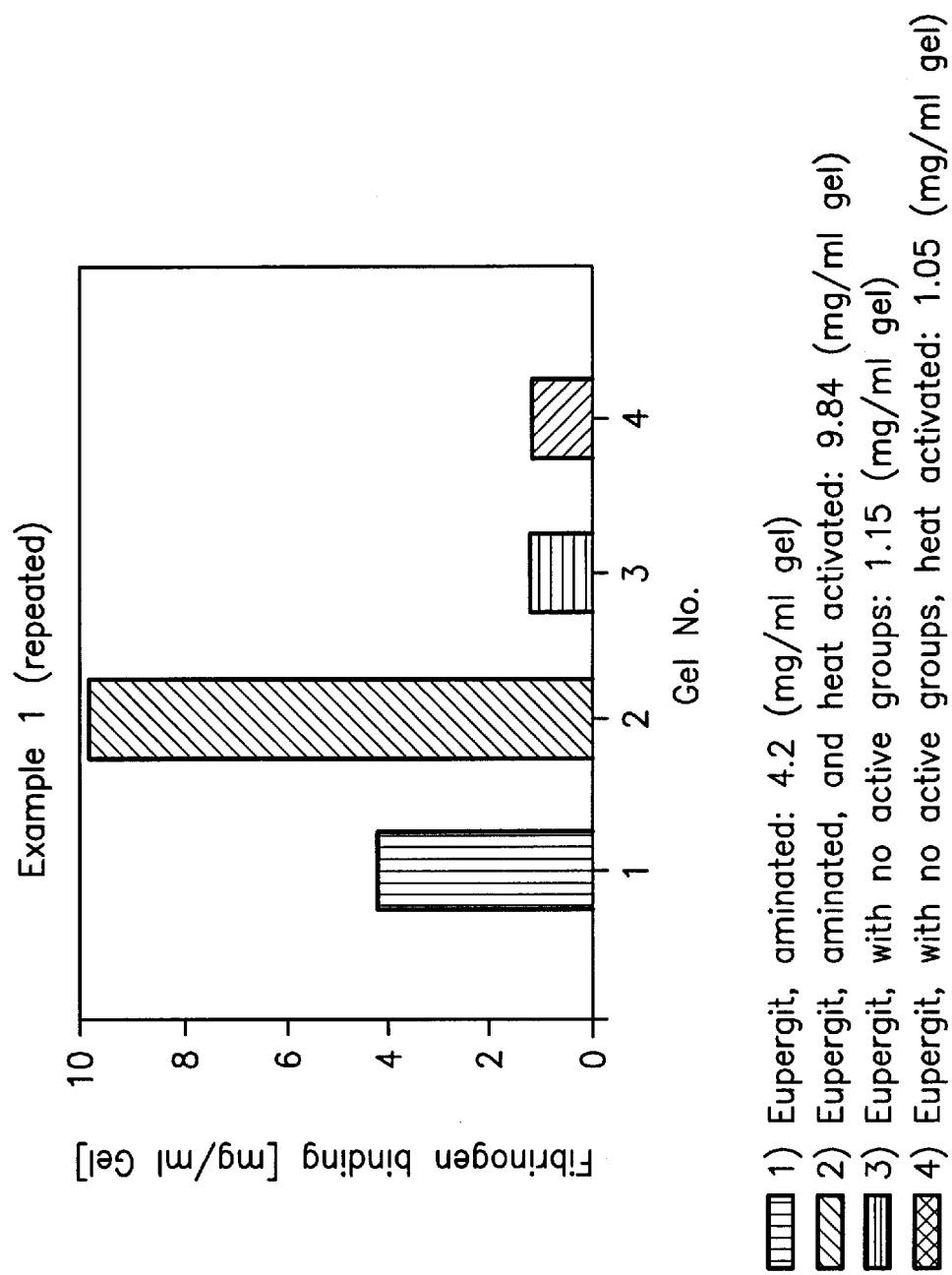
FIG. 2 is a graph showing the reduction of fibrinogen for a repeat of example 1.

In FIG. 2, the result of repeating example 1 is shown. Here the initial fibrinogen concentration was 2.6 mg/ml plasma. The previously noted findings were confirmed.

EXAMPLE 2

Manufacturing a carrier material by causing ethylene glycol dimethacrylate to react with glycidyl methacrylate.

The method described in Example 11 of International Patent Application No. WO 95/26988 was used to manufacture the carrier material.

The carrier material thus obtained was activated using aqueous ammonia in the manner described in Example 1 above. The aminated (activated) carrier material is shown below in a schematic representation.

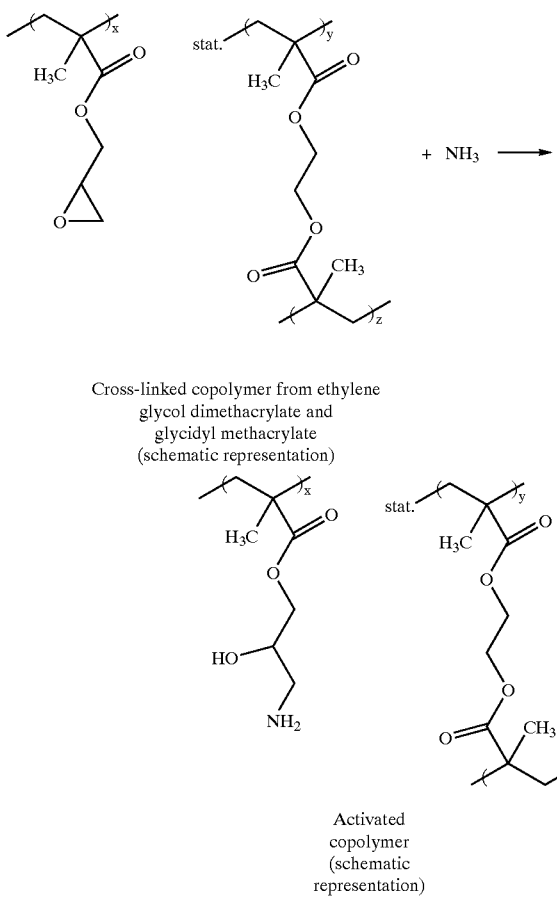

Cross-linked copolymer from ethylene glycol dimethacrylate and glycidyl methacrylate (schematic representation)

Activated copolymer (schematic representation)

A portion of the activated (aminated) copolymer was heat sterilized, i.e., heat activated, at 121° C.

Using the same method described in Example 1, the fibrinogen binding properties of the adsorbents thus obtained, i.e., aminated but not heat-activated copolymer, and aminated, heat-activated copolymer, were tested. The initial fibrinogen concentration was 2.8 mg/ml plasma in Example 2.

Figure 3:
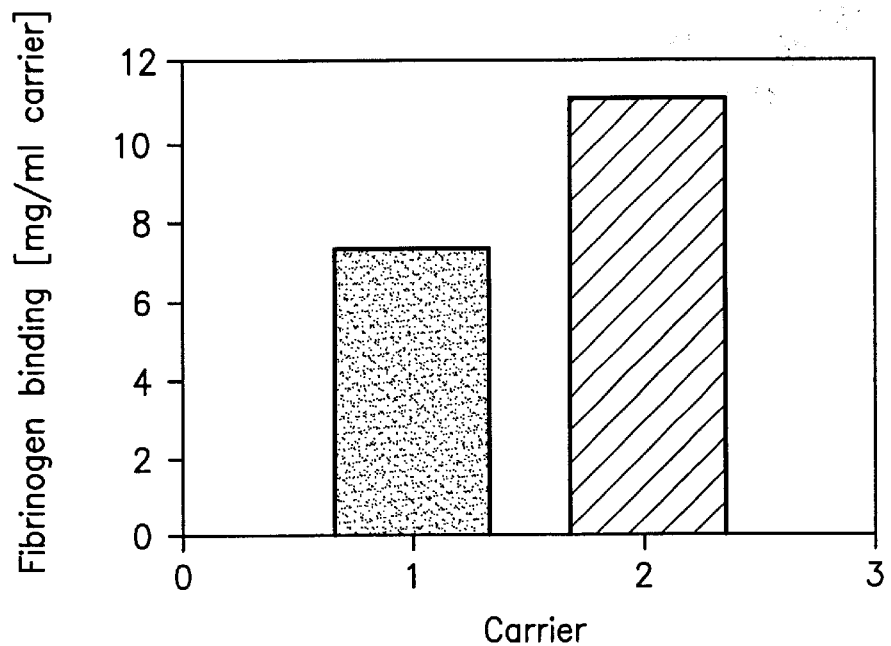
FIG. 3 is a graph showing the reduction of fibrinogen for example 2.

In FIG. 3, the reduction in fibrinogen, i.e., fibrinogen binding, is shown in mg/ml carrier material. FIG. 3 shows that heat activation of the aminated copolymer from ethylene glycol dimethacrylate and glycidyl methacrylate resulted in significantly greater fibrinogen binding capability.

Figure 4:
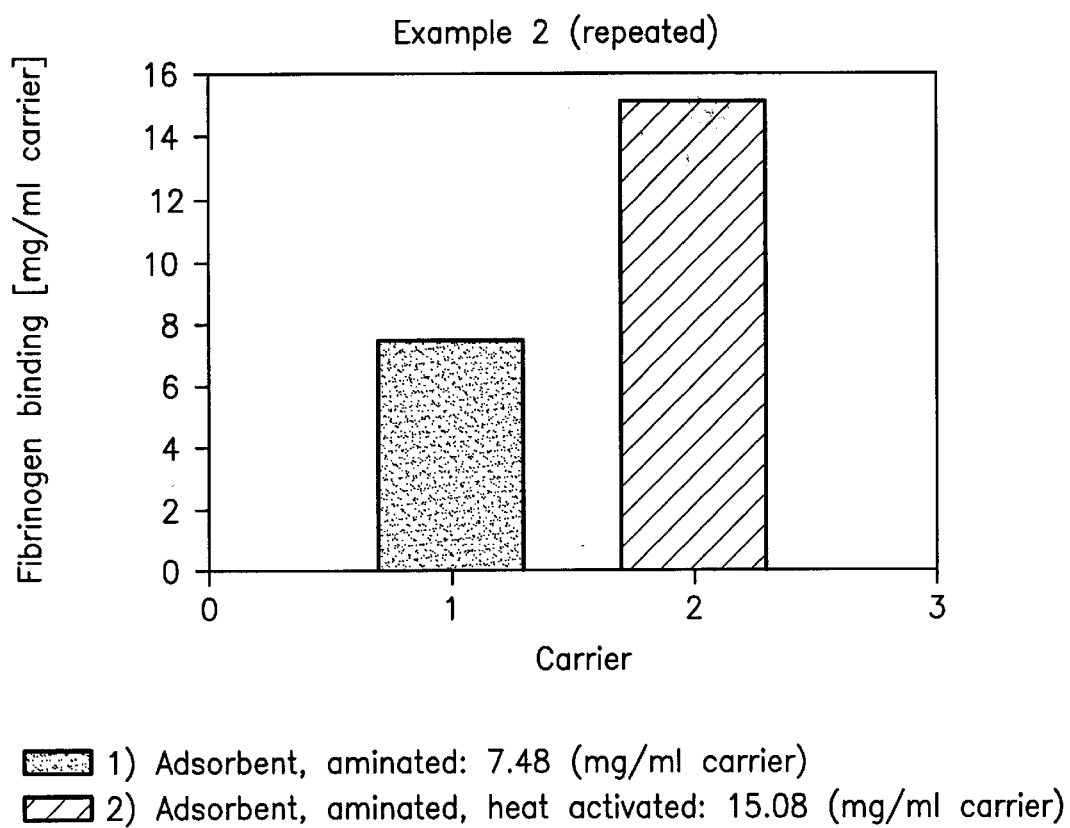
FIG. 4 is a graph showing the reduction of fibrinogen for a repeat of example 2.

In FIG. 4, the result of repeating Example 2 is shown. Here the initial fibrinogen concentration was 3.5 mg/ml plasma. The previously noted findings from Example 2 were confirmed completely.

What is claimed is:

1. An adsorbent for reducing the concentration of at least one of fibrinogen and fibrin in blood or blood plasma, comprising:
   a carrier material comprising a statistical copolymer produced by the suspension polymerization of the monomeric unit of (meth)acrylic amide in a quantity of 10 to 30% by weight, the monomeric unit of N,N'-methylene-bis(meth)acrylamide in a quantity of 30 to 80% by weight, and at least one of the monomeric units of allyl glycidyl ether and glycidyl-(meth)acrylate in a quantity of 10 to 20% by weight, wherein the percentages by weight are relative to the total weight of all of the monomeric units; and at least one amine group covalently bonded to the carrier material via the utilization of an aqueous solution of ammonia;
   wherein the adsorbent has been thermally treated at a temperature of over 100° C.

2. A method of producing an adsorber for the purpose of reducing the concentration of at least one of fibrinogen and fibrin in blood or blood plasma, said method comprising:
   adding an adsorbent to a housing to form an adsorber, wherein the adsorbent comprises:
   a carrier material comprising a statistical copolymer produced by the suspension polymerization of the monomeric unit of (meth)acrylic amide in a quantity of 10 to 30% by weight, the monomeric unit of N,N'-methylene-bis(meth)acrylamide in a quantity of 30 to 80% by weight, and at least one of the monomeric units of allyl glycidyl ether and glycidyl-(meth)acrylate in a quantity of 10 to 20% by weight, wherein the percentages by weight are relative to the total weight of all of the monomeric units; and at least one amine group covalently bonded to the carrier material via the utilization of an aqueous solution of ammonia;
   wherein the adsorbent has been thermally treated at a temperature of over 100° C.

3. An adsorber for the purpose of reducing the concentration of at least one of fibrinogen and fibrin in blood or blood plasma, comprising:
   a housing; and
   an adsorbent contained by the housing, wherein the adsorbent comprises:
   a carrier material comprising a statistical copolymer produced by the suspension polymerization of the monomeric unit of (meth)acrylic amide in a quantity of 10 to 30% by weight, the monomeric unit of N,N'-methylene-bis(meth)acrylamide in a quantity of 30 to 80% by weight, and at least one of the monomeric units of allyl glycidyl ether and glycidyl-(meth)acrylate in a quantity of 10 to 20% by weight, wherein the percentages by weight are relative to the total weight of all the monomeric units; and at least one amine group covalently bonded to the carrier material via the utilization of an aqueous solution of ammonia;
   wherein the adsorbent has been thermally treated at a temperature of over 100° C.

4. The adsorber of claim 3, wherein the adsorber has a volume of 250 to 1250 ml.

5. The adsorber of claim 3, the adsorber further comprising:
   a head on the housing;
   an inlet zone on the same side as the head; and
   an outlet zone on the opposite side as the head.

6. The adsorber of claim 5, further comprising a filter in the outlet zone.

7. The adsorber of claim 6, wherein the filter is a particle filter.

8. The adsorbent of claim 1, wherein the temperature of over 100° C. is 121° C.

9. The method of claim 2, wherein the temperature of over 100° C. is 121° C.

10. The adsorber of claim 3, wherein the temperature of over 100° C. is 121° C.

* * * * *